United States Patent Office 3,213,083
Patented Oct. 19, 1965

3,213,083
6-(AMINO-ACYLAMINO)-PENICILLANIC ACIDS
Harvey E. Alburn, West Chester, Norman H. Grant, Wynnewood, and Horace Fletcher 3rd, Pottstown, Pa., assignors to American Home Products Corporation, New York, N.Y., a corporation of Delaware
No Drawing. Filed Feb. 7, 1963, Ser. No. 256,817
1 Claim. (Cl. 260—239.1)

This is a continuation-in-part of application Serial No. 175,828 filed February 26, 1962, now abandoned.

This invention relates to new synthetic penicillins having potent activity against gram-negative and gram-positive micro-organisms.

In application Serial No. 175,828, there is disclosed a novel method for preparing various penicillanic acid derivatives including those having the formula:

(I) 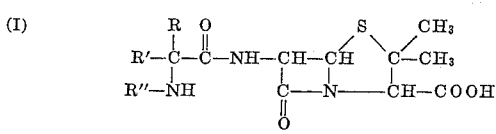

wherein R, R' and R'' each may represent a member selected from the group consisting of hydrogen, aryl, aralkyl, saturated alkyl, unsaturated alkyl, cycloalkyl, and heterocyclic radicals; R and R' may be joined to form a hydrocarbon ring; and R' and R'' may be joined to form a heterocyclic ring. As disclosed in our abandoned patent application Serial No. 175,828, R, R' and R'', when separate radicals or forming a ring as defined, may carry substituents such as those disclosed for aryl in said patent application and in U.S.P. 2,985,648, which is also referred to in said application.

The process, described and claimed in said co-pending application, generally comprises the reaction of a 4-substituted-2,5-oxazolidinedione (also known as an N-carboxy amino acid anhydride) with 6-aminopenicillanic acid under controlled conditions.

The N-carboxy amino acid anhydride reactant may be represented schematically as follows:

(II) 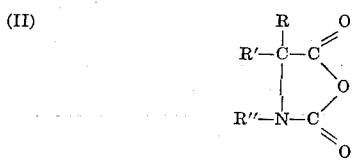

wherein R, R' and R'' each may have the same meaning as stated for these members for general structural Formula II.

As set forth in the co-pending application, the classic methods for preparing the 4-substituted-2,5-oxazolidinediones of Formula II above include (a) the carboalkoxy procedure, (b) the azide rearrangement procedure, and (c) the phosgenation procedure. These methods, of which phosgenation is preferred, have the desirable feature that they do not change the steric configuration when an asymmetric carbon is present. The reaction of the chosen amino acid with phosgene in method (c) to prepare the 4-substituted-2,5-oxazolidinedione desired may be represented schematically as follows:

(III) 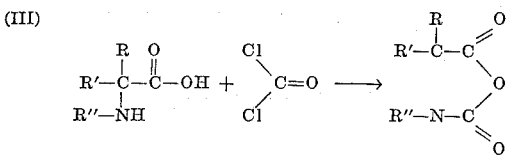

wherein R, R' and R'' each have the same meaning as in Formulas I and II.

As also disclosed in our co-pending patent application the amino acid reactant may, in certain instances, have the amino group thereof as a substituent on a phenyl group that is directly attached to the carboxyl group of the acid by a carbon atom of the benzene ring, said atom being ortho to the carbon atom to which the amino group is attached. Stated otherwise, the amino group is attached to a carbon atom that is in the beta position with respect to the carboxyl group of the acid rather than to the carbon atom alpha thereto, as is more usual for the amino acids. The phenyl group, moreover, may be substituted in each of the remaining four positions of the benzene ring as referred to hereinafter or two adjacent substituents may be joined to form an aryl or alicyclic ring. Thus, the amino acid starting material suitable for the ultimate production of penicillin compounds of the present invention may be represented by the following formula:

(IV) 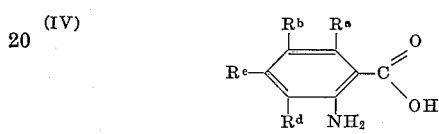

wherein each of $R^a$, $R^b$, $R^c$ and $R^d$ may be —H, —alkyl, —NH$_2$, —NO$_2$, —halogen, or —OH; or $R^a$ and $R^b$, $R^b$ and $R^c$ or $R^c$ and $R^d$ may be joined to form an aryl or alicyclic ring.

Thus, the reaction between phosgene and aryl amino acids, which are suitable as starting materials in the production of the penicillanic acid derivatives of the present invention, may be represented by a similar equation as follows:

(V) 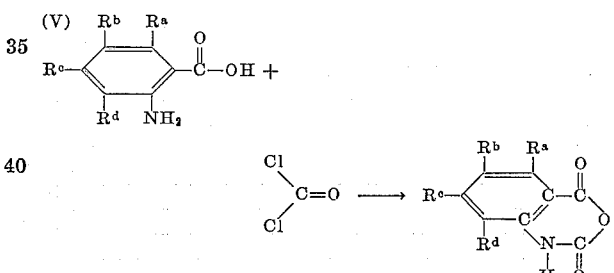

wherein $R^a$, $R^b$, $R^c$ and $R^d$ may have the same meaning as in Formula IV above. Preferably, in said phosgenation procedure, the amino acid reactant is dissolved or suspended in dioxane, phosgene is introduced into the reaction mixture, and the resulting anhydride is crystallized by the addition of an agent such as benzene.

Numerous methods for preparation of the 6-aminopenicillanic acid are now available in the art, including the methods referred to in said U.S.P. 2,985,648 and in U.S.P. 3,032,473, and hence need not be described here.

With the use of the method described generally in said co-pending application and above, there has now been discovered a series of new penicillanic acid derivatives having the formula:

(VI) 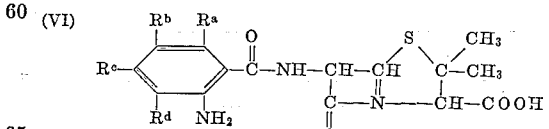

wherein each of $R^a$, $R^b$, $R^c$ and $R^d$ may be —H, —alkyl, —NH$_2$, —NO$_2$, —halogen or —OH.

In the preferred exercise of the method of the present invention, the N-carboxy amino acid anhydride chosen is reacted with 6-aminopenicillanic acid in approximately equimolar quantities in a cold aqueous solution in a pH range from about 3.8 to about 10.0 and preferably in the range 4.7–9.2. The mixture is stirred for several hours at a temperature from just above the freezing point of the aqueous mixture to about 37° C., and preferably in the range 0–10° C. Although not essential, it may be preferred to include a buffer having an ionic strength of above 0.02, preferably about 0.3, to aid in keeping the reaction mixture within the required pH range. Suitable buffers for maintaining the desired pH may be any mixture of organic or inorganic water-soluble acids, bases, or salts such as sodium acetate-acetic acid, calcium acetate-acetic acid, pyridine-acetic acid, formic acid-ammonia, etc. Alternatively, the reaction mixture may be maintained within the requisite pH range by careful addition of a base such as NaOH or the like.

The new compounds of the series defined above in Formula VI show desirable broad spectrum antibacterial activity and are useful as therapeutic agents in poultry and mammals, including man, in the treatment of infectious diseases caused by gram-positive and gram-negative bacteria, upon either parenteral or oral administration. They also have use as nutritional supplements in animal feed.

The following examples are illustrative of the invention but are not to be considered necessarily limitative thereof.

*Example I.—6-(2-aminobenzamido)penicillanic acid*

Prepare a mixture of 1.5 g. of isatoic anhydride and 1.2 g. of 6-aminopenicillanic acid in 150 ml. of water adjusted to pH 5.0 with 10 NaOH. Stir the mixture for 3 hours at room temperature and then freeze-dry the system. The product is active against *E. coli* and *Staph. aureus*.

*Example II.—6-(2-aminobenzamido)pencillanic acid*

Mix 50 mg. of isatoic anhydride with 40 mg. of 6-aminopenicillanic acid and 5 ml. of sodium acetate or sodium phosphate buffer in each of 8 beakers. The buffers are of identical ionic strength (0.1) but of varying pH. Stir in an ice bath for 3 hours and assay the reaction mixture against *Staph. aureus* 209P with potassium penicillin G as standard. The results are as follows:

| Final pH: | Relative antibiotic activity |
|---|---|
| 4.15 | 100 |
| 4.53 | 139 |
| 5.00 | 139 |
| 5.10 | 169 |
| 5.20 | 175 |
| 5.83 | 181 |
| 6.23 | 242 |
| 6.40 | 169 |

*Example III.—6-(2-amino-5-nitrobenzamido)penicillanic acid*

Mix 86.4 mg. (0.4 millimole) of 6-aminopenicillanic acid, 82.7 mg. (0.4 millimole) of 6-nitroisatoic anhydride and 10 ml. of cold water in each of 8 flasks. Stir at 1° for 1 hour, maintaining a different pH in each system. Dilute and assay for activity against *Staph. aureus* 209P, using ampicillin as standard.

The results are as follows:

| pH: | Mg. antibiotic per ml. |
|---|---|
| 4.0 | <0.12 |
| 5.0 | 0.21 |
| 6.0 | 0.45 |
| 7.0 | 0.63 |
| 7.5 | 0.80 |
| 8.0 | 1.03 |
| 8.6 | 1.40 |
| 8.9 | 1.27 |

*Example IV.—6-(2-amino-5-nitrobenzamido)penicillanic acid*

Mix 3.31 g. of 6-nitroisatoic anhydride with 3.46 g. of 6-aminopenicillanic acid in 400 ml. of water. Stir at 1° for 1 hour, maintaining the pH at 9.0. Filter, and freeze-dry the filtrate. The product, which weighs 4.15 g., is active against both *Staph. aureus* 209P and *E. coli* 11370.

*Example V.—6-(2-amino-5-chlorobenzamido)penicillanic acid*

Mix 786 mg. (4-millimoles) of 6-chloroisatoic anhydride with 864 mg. (4 millimoles) of 6-aminopenicillanic acid in 100 ml. of cold water; stir for 1 hour at 1°, maintaining the pH at 7.0. Filter, and freeze-dry the filtrate. The product is active against *Staph. aureus* 209P and *E. coli* 11370.

*Example VI.—6-(2-amino-5-methylbenzamido)penicillanic acid*

Mix 302 mg. (2 millimoles) of the N-carboxyanhydride of 2-amino-5-methylbenzoic acid with 432 mg. (2 millimoles) of 6-aminopenicillanic acid in 50 ml. of ice cold water. Stir at 1° for 1 hour, maintaining the pH at 4.5. Filter, and freeze-dry the filtrate. The product is active against *Staph. aureus* 209P and *E. coli* 11370.

*Example VII.—6-(2-amino-3-naphthamido)penicillanic acid*

Mix 852 mg. (4 millimoles) of 2-amino-3-naphthoic acid-N-carboxyanhydride with 860 mg. (4 millimoles) of 6-aminopenicillanic acid in 100 ml. of ice cold water, and stir at 1° for 1 hour while maintaining the pH at 6.0. Filter and freeze-dry the filtrate. The product is active against both *Staph. aureus* 209P and *E. coli* 11370.

*Example VIII*

Add 0.1 millimole (16.3 mg.) of isatoic anhydride to each of 4 flasks, containing, respectively, 0.1, 0.2, 0.3, and 0.4 millimole of 6-aminopenicillanic acid in 10 ml. of ice-cold water. Stir for 1 hour, maintaining the pH at 5.0. The reaction mixtures, assayed against *Staph. aureus* 209P, using D-α-aminobenzyl penicillin as standard, showed the following:

| Molarity of 6–APA: | μg. of antibiotic/ml. |
|---|---|
| 0.01 | 26 |
| 0.02 | 51 |
| 0.03 | 61 |
| 0.04 | 53 |

As will be understood by those skilled in the art, the compounds of the invention may be utilized in their acid form or in the form of the therapeutically-active salts thereof, e.g., the sodium or potassium salts, or hydrochloride, etc., or in the form of the pharmaceutically-acceptable acid-addition salts prepared by the reaction of the penicillin compounds with an amine or diamine base, e.g., procaine or various N,N'-disubstituted alkylenediamines, such as N,N'-dibenzylethylene-diamine, etc.

We claim:

6-(2-amino-3-naphthamido)penicillanic acid.

References Cited by the Examiner

UNITED STATES PATENTS

| 2,951,839 | 9/60 | Doyle et al. | 260—239.1 |
| 3,043,831 | 7/62 | Doyle et al. | 260—239.1 |
| 3,053,831 | 9/62 | Childress et al. | 260—239.1 |
| 3,127,394 | 3/64 | Perron et al. | 260—239.1 |

NICHOLAS S. RIZZO, *Primary Examiner.*